P. J. HILL.
SAWING CARRIAGE.
APPLICATION FILED NOV. 5, 1918.
1,317,132.
Patented Sept. 23, 1919.
3 SHEETS—SHEET 1.
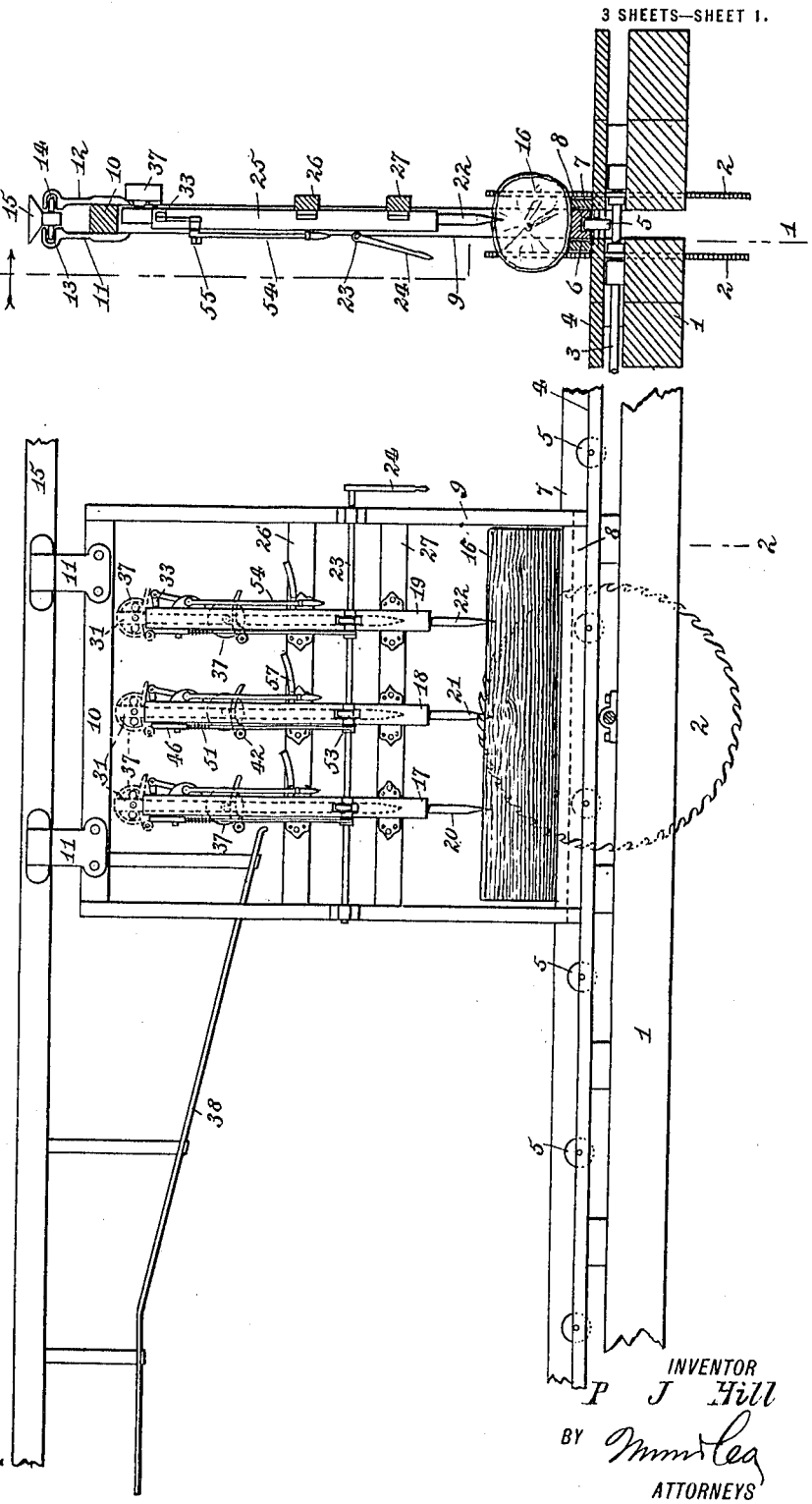
WITNESSES
Wm P. Goebel
A. L. Kitchin
INVENTOR
P J Hill
BY
ATTORNEYS

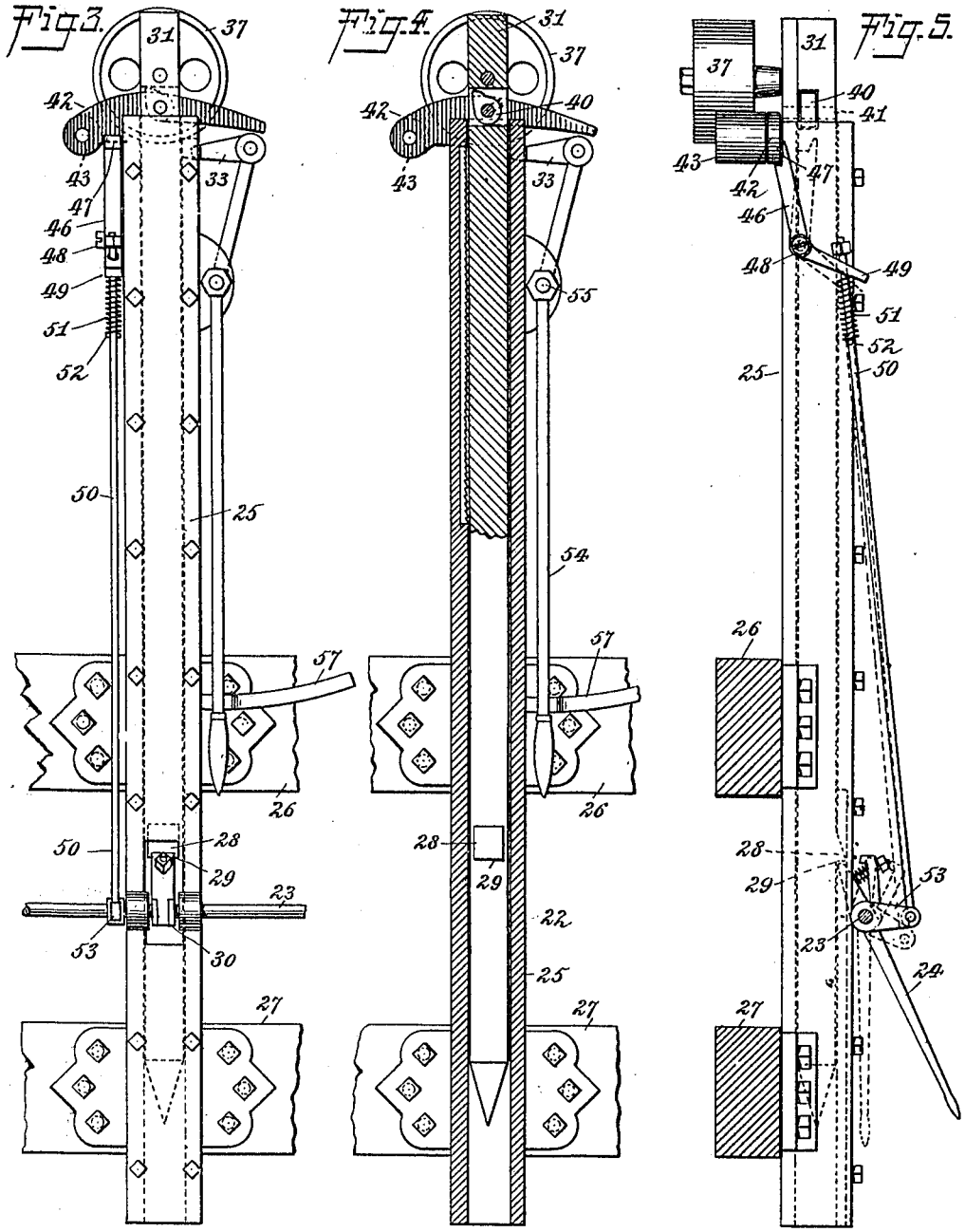

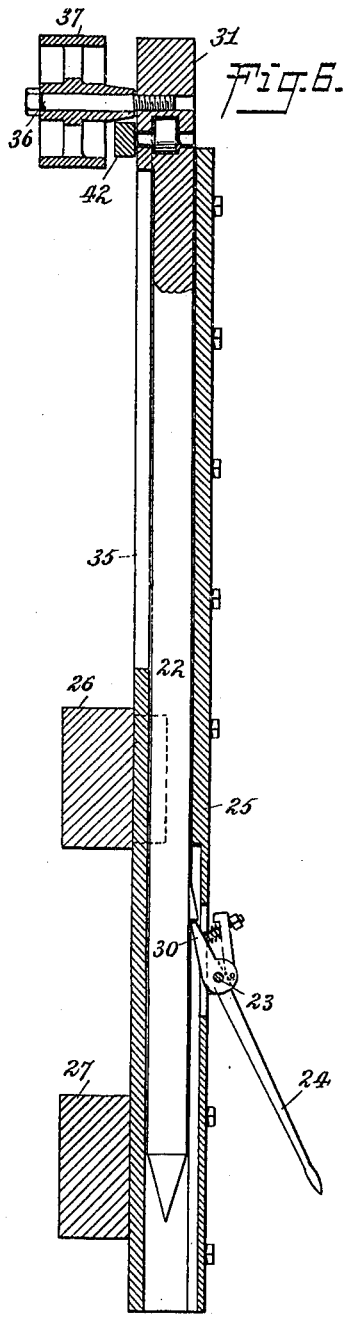
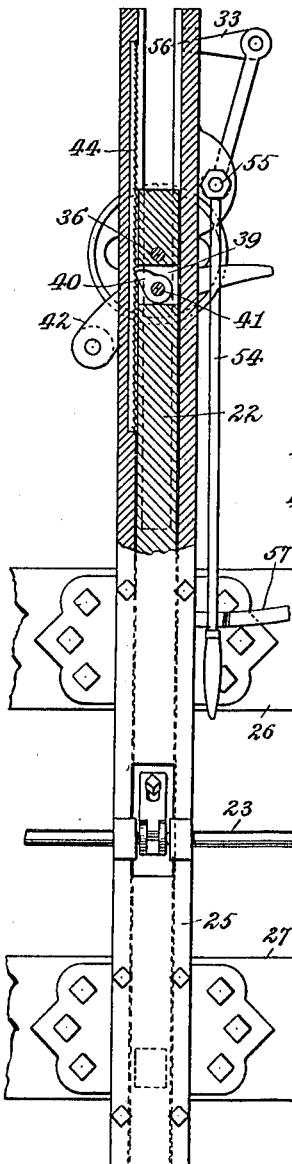
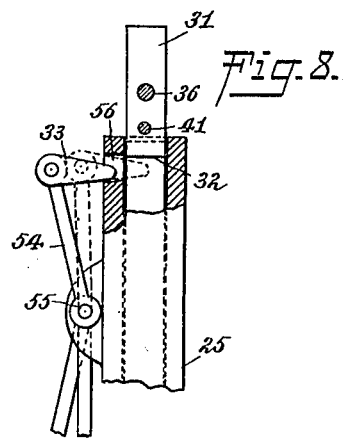
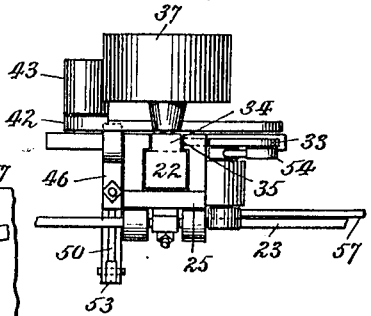
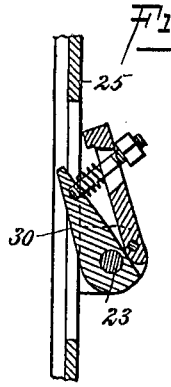

UNITED STATES PATENT OFFICE.

PERLEY J. HILL, OF CHATHAM, NEW YORK.

SAWING-CARRIAGE.

1,317,132.  Specification of Letters Patent.  Patented Sept. 23, 1919.

Application filed November 5, 1918.  Serial No. 261,249.

*To all whom it may concern:*

Be it known that I, PERLEY J. HILL, a citizen of the United States, and a resident of Chatham, in the county of Columbia and State of New York, have invented a new and Improved Sawing-Carriage, of which the following is a full, clear, and exact description.

This invention relates to sawing carriages and has for an object the provision of an improved short log sawing carriage and an automatic dog whereby logs may be sawed on one or two sides easily and rapidly.

Another object of the invention is to provide a carriage and saw structure wherein a log placed in the carriage manually is automatically sawed and automatically released after one or two sides have been sawed therefrom.

A further object in view is to provide a carriage which will saw two slabs from a log for producing a railroad tie, or for sawing four slabs as desired and thereby produce a tie substantially square in cross section.

In the accompanying drawings:

Figure 1 is a fragmentary sectional view of a sawing carriage disclosing an embodiment of the invention, the same being taken on line 1—1 of Fig. 2.

Fig. 2 is a transverse sectional view through Fig. 1 on line 2—2.

Fig. 3 is a front view on an enlarged scale of one of the dogs shown in Fig. 1, the same embodying certain features of the invention.

Fig. 4 is a longitudinal vertical section through the structure shown in Fig. 3.

Fig. 5 is an edge view of the structure shown in Fig. 3.

Fig. 6 is a sectional view through Fig. 3 taken at right angles to that shown in Fig. 4.

Fig. 7 is a front view of the dog shown in Fig. 3 the upper part broken away for better illustrating the structure, the moving parts being shown in their lowered position.

Fig. 8 is a fragmentary view of the upper part of the dog shown in Fig. 3, the same being taken from the opposite side to that shown in Fig. 3.

Fig. 9 is a top plan view of the structure shown in Fig. 3.

Fig. 10 is an enlarged fragmentary sectional view shown with the pawl and associate parts embodying certain features of the invention.

Referring to the accompanying drawings by numerals 1 indicates a base or foundation of any kind on which a pair of saws 2 are mounted and driven by any suitable power connected with the shaft 3. A floor or platform 4 is arranged slightly above the base 1, said floor carrying a number of rollers 5 and a pair of guiding boards or raised portions 6 and 7 arranged on each side of the wheels 5 as shown in Fig. 2. Arranged upon the platform 4 and constructed to rest on the wheels 5 is a carriage 8 having hangers 11 and 12 secured thereto and carrying rollers 13 and 14 bearing against the beam 15 whereby the frame 9 cannot swing, but must move back and forth longitudinally of the guides 6 and 7. The carriage 8 may be flat on the top or slightly concave if desired, said carriage being designed to receive a log. Said log must be of necessity short to fit between the uprights of frame 9 as shown in Fig. 1. As soon as the log has been placed in position manually dogs 17, 18 and 19 are operated so that the pins 20, 21 and 22 may drop downwardly and sink into the log somewhat so as to hold the same in place. These pins are locked in their lowered position after moving downwardly and consequently prevent any independent movement of the log until the saws 2 have performed their function. The logs, of course, are placed in position when the frame 9 is away from the saws 2 as for instance to the right thereof as shown in Fig. 1.

After the parts have been placed in position as just described the frame 9 and the carriage 8 are moved along past the saws 2, said saws being spaced any desired distance apart and arranged to cut slabs from opposite sides of the log simultaneously as indicated in Fig. 2. If it is desired to square the log the carriage is returned to its former position and the log again placed on the carriage so that the flat side will engage the carriage and two more slabs removed. The saws are held on the shaft 3 by any desired means, as suitable clamping collars, nuts, or the like, said clamping means permitting an adjustment of the saws toward or from each other so as to cut logs of substantially any size. It will be observed, however, that the log must project beyond the frame 9 in order to engage the saws, but this is no objection as the frame is comparatively narrow, usually a few inches wide.

The various dogs 17, 18 and 19 are identical in construction and are operated simultaneously by the rod 23 which in turn is operated by a lever 24. Lever 24 is swung to one side and all of the dogs are released as hereinafter fully described so as to automatically engage the log 16, after which they are locked in place. If desired any one, or all of the dogs could be locked against downward movement even though lever 24 and shaft 23 are moved. The detail construction of each of the dogs is identical so that the description of one will apply to all. In Figs. 3 to 10 inclusive will be seen illustrations of the various structures of which the dog is composed. From these figures it will be observed there is provided a boxing or frame 25 which is preferably square and which is secured to the cross bars 26 and 27 of the frame 9. In the frame 25 the pin 22 is slidingly mounted, said pin being formed with a lug 28 having a shoulder 29 adapted to be engaged by the pawl 30, (Figs. 6 and 10), said pawl being rigidly secured to the rod 23. The pawl 30 acts to normally hold the pin 22 in an elevated position as shown for instance in Figs. 4 and 6.

At the upper end of pin 22 a head 31 is formed, said head preferably being integral with the remaining part of the pin, though it may be made separately and rigidly secured thereto. The head 31 is provided with an overhanging shoulder 32 adapted to coact with the supporting arm 33, (Figs. 7 and 8) hereinafter fully described. The projection 34 provided on the shoulder 32 is shown extending through a slot 35 in Fig. 9, said slot being positioned on one side of the casing 25 so as to accommodate the projection 34 as it moves upwardly and downwardly with the remaining part of the pin 22. The head 31 is provided with a bolt or spring pin 36 on which roller 37 is rotatably mounted, said roller being adapted to engage the inclined rail 38 for elevating the pin as hereinafter described. A chamber or cutaway portion 39 is provided in head 31 as shown in Figs. 6 and 7, said chamber accommodating a pawl 40 which is rigidly secured to shaft 41, said shaft being loosely journaled in the head 31, but rigidly secured to the double lever 42 which is provided with a wheel 43 at one end, said wheel overbalancing the lever when released so as to cause the pawl 40 to come into engagement with the teeth of the rack 44 and thereby lock the pin 22 against a return movement. To hold the double lever 42 and associate parts in their proper position, as shown in Figs. 3 and 5, a bell crank lever 46 is provided, the end 47 thereof being engaged by and adapted to fit against and partially beneath lever 42 for holding the same in an elevated position. The bell crank lever 46 is pivoted at 48 on the boxing 25 and is provided with an aperture in the short end 49 to accommodate the rod 50. A spring 51 is arranged on rod 50 and bears at one end against the short end 49 of bell crank lever 46 and against the stop 52. The lower end of rod 50 is pivotally connected to an arm 53 rigidly secured to shaft 23 so that when shaft 23 is rocked by the lever 24 not only will the pawl 30, shown in Fig. 6, be released, but movement will be transmitted through rod 50 and associate parts for moving the notched end 47 away from the double lever 42 whereupon said double lever will swing over to substantially the position shown in Fig. 7. In this way the pin 22 is released so as to drop down and sink into the log 16 and is then automatically locked in its lowered position. After the carriage has been moved across the saw and it is desired to release the dogs the movement of the carriage is continued so that the roller 43 will engage the track 38 which is at an incline for part of its distance. During a continued forward movement of the frame 9 wheel 43 will be gradually raised and consequently pawl 40 will be moved out of engagement with the rack 44 so that when the wheel 37 engages the track pin 22 will be loose and may readily move upwardly as the wheel 37 and associate parts are moved upwardly by track 38. This upward movement is continued until the wheel 37 has reached the horizontal section 38'. Lever 24 is then moved for causing the pawl 30 to engage the lug or projection 28 and for causing the bell crank lever 46 to engage the double lever 42 whereby the parts are locked in their elevated position. The carriage 8 and frame 9 may then be moved back to their former position for receiving a new log and the operation repeated. If, for any reason, it should be undesirable to use all the dogs any one may be turned out by an operation of the lever 54 which lever is pivotally mounted at 55 and carries the arm 33 illustrated particularly in Fig. 8. From this figure it will be observed that the arm 33 extends through an opening 56 in the boxing 25 so as to project beneath the shoulder 32 of the head 31. When this lever has been operated the releasing of pawl 30 will not permit the pin to drop, said pin will then rest on arm 33. As shown in Figs. 3 and 4 the lever 54 is normally held by a spring catch 57 so that it will hold the arm 33 in an inoperative or disengaged position.

What I claim is:

1. A sawing device of the character described comprising a saw, a carriage, means for guiding the carriage past the saw, a frame connected with said carriage, dogs arranged on said frame adapted to engage a log on the carriage for preventing independent movement thereof, and means for automatically disengaging said dogs from the log at a predetermined time.

2. A log sawing device comprising a saw, a carriage, means for guiding the carriage past the saw, a frame connected with the carriage, a plurality of dogs arranged on said carriage, each of said dogs being provided with a pin formed with the lower end adapted to engage a log on the carriage, means for normally holding the pin in an elevated position, means for manually releasing said pin, and a stationary member coacting with said dogs for raising the pins thereof automatically when the carriage is moved to a predetermined position.

3. A log sawing device comprising a saw, a carriage adapted to support a log, means for guiding the carriage past said saw, a frame connected with said carriage, a dog mounted on said frame, said dog comprising a casing, a loosely positioned pin arranged in the casing, a locking pawl for holding said pin in a normally elevated position, means for locking said pin in a lowered position, and a stationary member coacting with the dog for raising and locking said pin when the dog reaches a predetermined position.

4. A log sawing device of the character described comprising a saw, a carriage, means for guiding the carriage past said saw, a dog engaging the log on the carriage for holding the log against independent movement, said dog comprising a casing connected with said carriage, a freely reciprocating pin arranged in the casing, a pawl for normally holding the pin elevated, a locking pawl and a rack coacting therewith for locking the pin in a lowered position, manually operated means for disengaging the first mentioned pawl, and a stationary member coacting with the dog for elevating said pin and interlocking the same simultaneously.

5. A log sawing device comprising a saw, a carriage for supporting a log, means for guiding the carriage past said saw, a frame connected with said carriage, a dog mounted on said frame provided with a casing, a loosely mounted pin, a pawl for normally locking the pin in said casing, a second pawl for locking the pin when in engagement with said log, a double acting lever pivotally connected with the last mentioned pawl, an anti-friction member connected with said pin near the upper end, means for manually disengaging said first mentioned pawl so as to allow the pin to drop by gravity, and a stationary inclined runway so as to engage said double acting lever for disengaging the second mentioned pawl and for acting on said anti-friction member for raising said pin when the frame has moved a predetermined distance in one direction.

6. A log sawing device comprising a saw, a log supporting carriage, means for guiding the carriage past the saw, a frame connected with said carriage, a plurality of dogs arranged on said frame, each of said dogs being provided with a casing, a loosely mounted pin arranged in the casing adapted to engage said log when released, a pawl normally holding said pin in an elevated position, a second pawl acting as means for locking the pin in a lowered position, a rack engaging said second pawl, means for normally disengaging the first mentioned pawl so as to allow the pin, including the second mentioned pawl, to drop downwardly under the action of gravity, and an inclined track arranged in the path of movement of an extension from said second pawl whereby the second mentioned pawl is released and said pin is raised until said first mentioned pawl engages the pin for locking the same in an elevated position.

7. A log sawing device comprising a saw, a log supporting carriage, means for guiding a carriage past the saw, a frame connected with said carriage, a plurality of dogs arranged on said frame, each of said dogs comprising a casing, a freely reciprocating pin arranged in said casing, said pin being adapted to engage said log when lowered and hold the log against independent movement, means for normally holding said pin in an elevated position, means for returning said pin from a lowered position to an elevated position, means for releasing the pin so that it will drop by gravity, and a locking mechanism for locking any of said pins in an elevated position, said locking means acting individually on the respective pins.

PERLEY J. HILL.